United States Patent [19]
Scott

[11] Patent Number: 5,501,010
[45] Date of Patent: Mar. 26, 1996

[54] METHOD OF ASSEMBLY FOR A FAN

[75] Inventor: George E. Scott, Marshall, Mich.

[73] Assignee: Eaton Corporation, Cleveland, Ohio

[21] Appl. No.: 287,388

[22] Filed: Aug. 8, 1994

[51] Int. Cl.$^6$ .................................................. B23P 15/00
[52] U.S. Cl. ...................................... 29/889.3; 29/525.04
[58] Field of Search ................................... 29/889.3, 428, 29/525.1; 416/93, 132, 169, 143, 135, 247

[56] References Cited

U.S. PATENT DOCUMENTS

| | | | |
|---|---|---|---|
| 3,642,382 | 2/1972 | Hayashi | 416/169 |
| 3,914,069 | 10/1975 | Arrington et al. | 416/132 |
| 4,150,919 | 4/1979 | Matucheski | 416/93 |
| 4,252,504 | 2/1981 | Covington et al. | 416/143 |
| 4,487,551 | 12/1984 | Mizutani et al. | 416/135 |
| 5,002,462 | 3/1991 | Janisse | 416/247 |

Primary Examiner—Irene Cuda
Attorney, Agent, or Firm—L. J. Kasper

[57] ABSTRACT

An improved method of assembling a fan (31) and a fan drive (11) is disclosed in which a bolt (25) is threaded into each of the bores (23) defined by the body (13) of the fan drive. Each bolt is positioned such that the head portion (29) is separated from an adjacent surface (47) of the body by an axial dimension at least equal to the axial thickness (X) of the spider (33) of the fan assembly. The fan has keyhole shaped fastener openings (41) including a larger portion (43) and a smaller portion (45). The fan (31) is positioned on the fan drive with the bolt heads extending through the larger portions (43) of the fastener openings. The fan is then rotated relative to the fan drive to a position in which the threaded portion (27) of each fastener is received within the smaller portion (45) of the fastener opening. Finally, the bolts are tightened against the fan spider (33). This method of assembly substantially eliminates the opportunity for bolt strippage in the OEM assembly plant, where the fan and fan drive are assembled.

9 Claims, 3 Drawing Sheets

5,501,010

METHOD OF ASSEMBLY FOR A FAN

BACKGROUND OF THE DISCLOSURE

The present invention relates to an assembly of a fan and a fan drive, and more particularly, to an improved method for assembling the fan and fan drive.

It will become apparent to those skilled in the art from the subsequent description that the assembly method of the present invention may be utilized advantageously with various types of fans, as well as with various types of fan drives. However, the invention is especially useful for assembling a radiator cooling fan, for cooling a vehicle engine, to a viscous fan drive, and the invention will be described in connection therewith. The invention is also especially useful when the fan is of the type having a hub portion and fan blades molded integrally from a plastic material, and an annular metal spider having its outer periphery attached to the hub portion and its inner periphery attached to the housing of the viscous fan drive. Such a fan and fan drive assembly is illustrated and described in U.S. Pat. No. 4,169,693, assigned to the assignee of the present invention and incorporated herein by reference.

Typically, the viscous fan drive and the radiator cooling fan have been manufactured and shipped separately to the vehicle OEM assembly plant (i.e., either the engine assembly plant or the final vehicle assembly plant).

It has been conventional practice to provide the housing of the viscous fan drive with a plurality (typically, four) of threaded bores. Then, on the moving assembly line, the assembler must position the fan on the fan drive, insert a bolt in each threaded bore, and "torque" or tighten each of the bolts to the appropriate level of tightness. The tightening of the bolts is normally done with a pneumatic (air) gun. It should be noted that the assembler typically has less than about one minute to assemble the fan to the fan drive and then put that assembly on the water pump, either by bolting it to the water pump or screwing it on the water pump shaft.

Although the above-described assembly routine has been generally satisfactory, the occurrence of bolt strippage problems in the assembly plant has been undesirably high. One reason for the occurrence of bolt strippage is that the assembler, in order to keep pace with the movement of the assembly line, may actually start the bolt into the fan drive housing using the air gun, which may result in cross-threading of the threaded bores. Occasionally, the assembler will be given the wrong bolts (for example, ones which are too short), and the attempt to insert the incorrect bolts (or overtorquing bolts which are too short) results in damage to the threads of the fan drive housing. In either case, the result is that one or more of the threaded bores in the fan drive housing for the bolts holding the fan onto the fan drive is stripped, and the fan drive either becomes a warranty return, and is shipped back to the viscous fan drive manufacturer, or is merely discarded, representing a loss for the vehicle OEM.

The above-described problems are somewhat common on the typical fan and fan drive assembly requiring four bolts, but there is obviously even greater opportunity for bolt strippage and damage to the fan drive on some of the newer, larger fans and fan drives which require six bolts.

SUMMARY OF THE INVENTION

Accordingly, it is an object of the present invention to provide an improved fan and fan drive and method of assembly therefor which can substantially eliminate the problems associated with bolt strippage in the OEM assembly plant.

It is a more specific object of the present invention to provide an improved method of assembling a fan and fan drive which substantially eliminates the opportunity for cross-threading of the bolts in the OEM assembly plant by eliminating from the assembly routine in the assembly plant the initial insertion of the bolts into the threaded bores.

The above and other objects of the invention are accomplished by the provision of an improved method of assembling a fan and fan drive, the fan drive being of the type comprising an output assembly, an input member, and means operable to transmit torque from the input member to the output assembly. The fan is of the type comprising a mounting portion adapted to be bolted to the output assembly of the fan drive and a plurality of fan blades. The output assembly of the fan drive defines a plurality N of bores, and a plurality N of threaded fasteners, each of the fasteners adapted to be in threaded engagement with one of the bores, and each of the fasteners including a threaded portion and a head portion. The mounting portion of the fan has an axial thickness X and defines a plurality N of fastener openings.

The improved method comprises:

(a) inserting each of the threaded portions of the plurality N of threaded fasteners into one of the bores, to a position whereby the head portion is spaced from an adjacent surface of the output assembly by an axial dimension at least equal to the axial thickness X;

(b) providing a fan wherein each of the fastener openings is generally keyhole-shaped, and includes a first, larger portion which is larger than the head portion of the fastener, and a second, smaller portion, which is smaller than the head portion, but larger than the threaded portion;

(c) subsequent to steps (a) and (b), placing the mounting portion of the fan proximate the adjacent surface of the output assembly, with the head portions of the threaded fasteners extending through the first, larger portions of the fastener openings;

(d) moving the fan relative to the fan drive to a position in which the second, smaller portions of the fastener openings are disposed about the threaded portions of the fasteners; and (e) tightening the threaded fastener head portions against the mounting portion of the fan.

DESCRIPTION OF THE PREFERRED EMBODIMENTS

Figure 1:
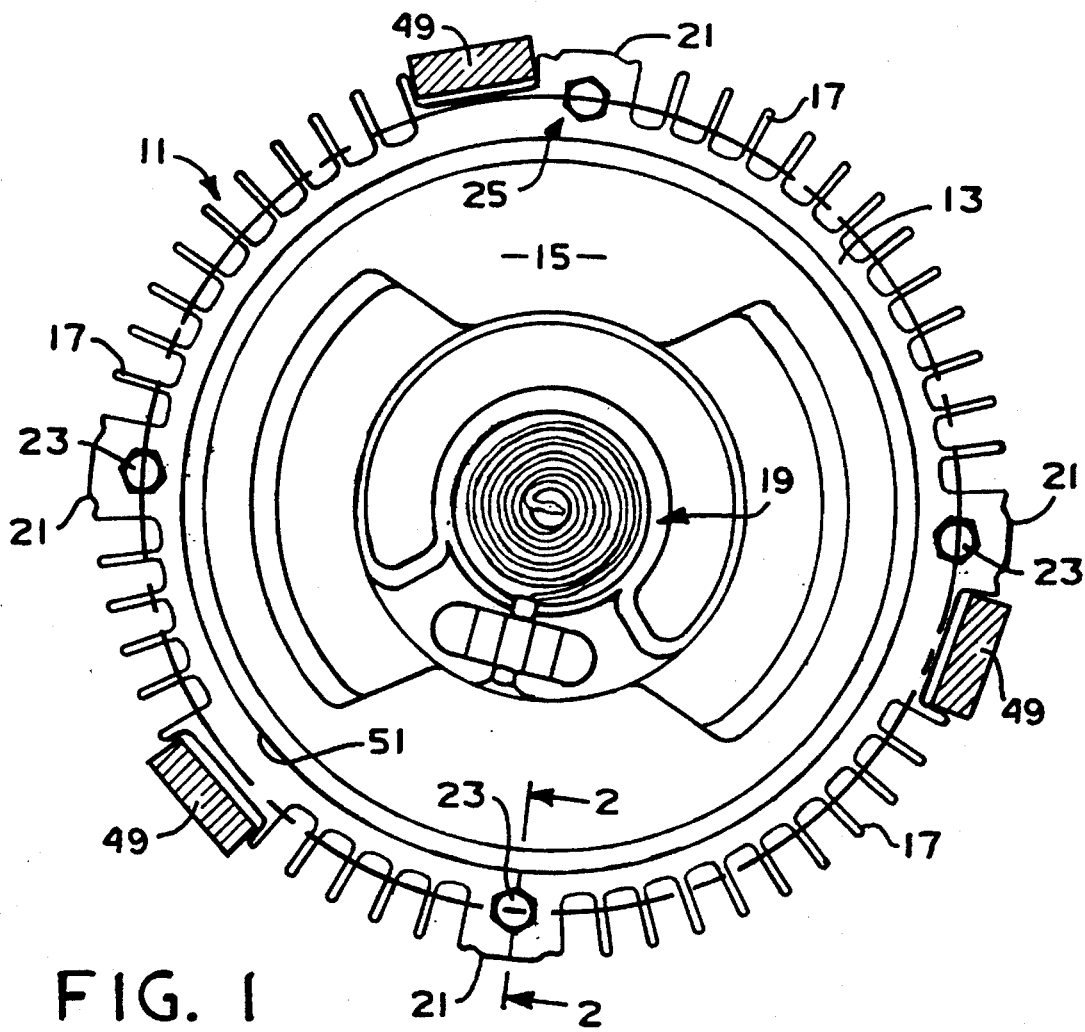
FIG. 1 is a front plan view of a fan drive of the type with which the present invention may be utilized, with the fan drive being disposed within an assembly fixture.

Referring now to the drawings, which are not intended to limit the invention, FIG. 1 illustrates a viscous fan drive, generally designated 11, of the type with which the present invention may be utilized. The particular viscous fan drive 11 illustrated in FIG. 1 is sold commercially as a Series 130 viscous fan drive, by the assignee of the present invention. The viscous fan drive 11 may be made in accordance with the teachings set forth in U.S. Pat. Nos. 4,271,946 and 4,735,300, both of which are assigned to the assignee of the present invention and incorporated herein by reference. The viscous fan drive 11 will be described only briefly herein in view of the above incorporation of patents.

The viscous fan drive 11 includes a body member 13, most of which is hidden from view in FIG. 1 by a cover member 15. The body member 13 includes a plurality of peripheral cooling fins 17 which, as is well known to those skilled in the art, serve to transfer heat away from the body member 13, the heat being generated in response to the transmission of torque from an input member (not shown herein; see incorporated patents) to the "output" of the fan drive 11. The output comprises the assembly of the body member 13 and cover member 15.

The particular viscous fan drive 11 illustrated in FIG. 1 is of the temperature-sensing type and therefore, includes a bi-metal coil assembly 19 mounted on the forward surface of the cover member 15, and operable to control the amount of viscous fluid in an operating chamber (not shown herein), in a manner well known to those skilled in the art.

The body member 13, in the subject embodiment, includes four fan mounting portions 21, each of which defines a threaded bore 23, each of which is adapted to receive a threaded fastener or bolt 25.

Figure 2:
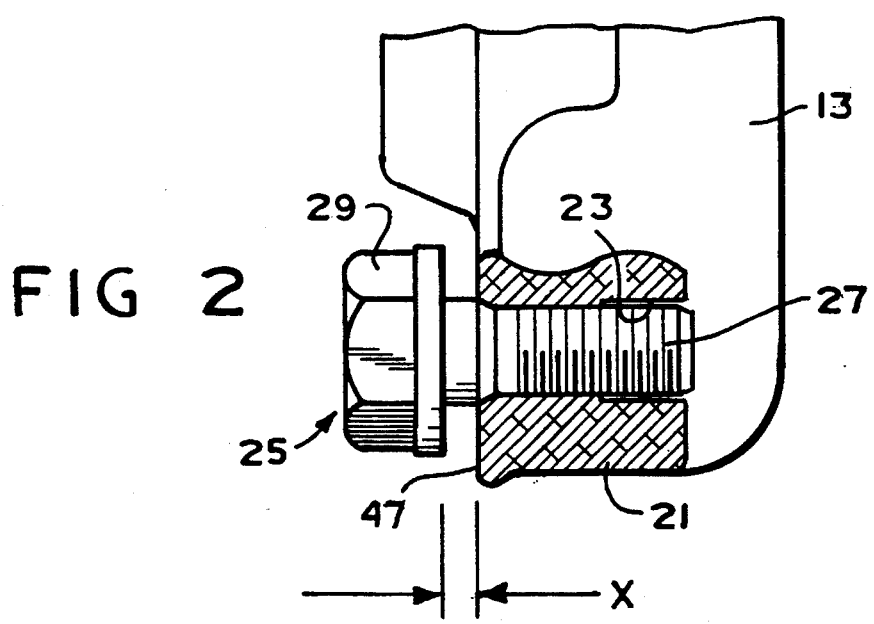
FIG. 2 is an enlarged, fragmentary axial cross-section, taken on line 2—2 of FIG. 1, but with a bolt inserted in the threaded bore.

Referring now to FIG. 2 in conjunction with FIG. 1, it may be seen that FIG. 1 shows three of the threaded bores 23, with the fourth threaded bore (the one near the 12 o'clock position in FIG. 1) being hidden from view by the presence of a bolt 25. In FIG. 2, which is taken on line 2—2 of FIG. 1, a bolt 25 has been added, with the purpose of FIG. 2 being to illustrate one aspect of the assembly method of the present invention. The bolt 25 includes a threaded portion 27 and a head portion 29, which, in the subject embodiment, is a hex head, although the present invention is not limited to any particular configuration of threaded fastener or head type. Instead, within the scope of the present invention, the fasteners may be of any configuration which is consistent with the practice of the assembly method, to be described subsequently.

Figure 3:
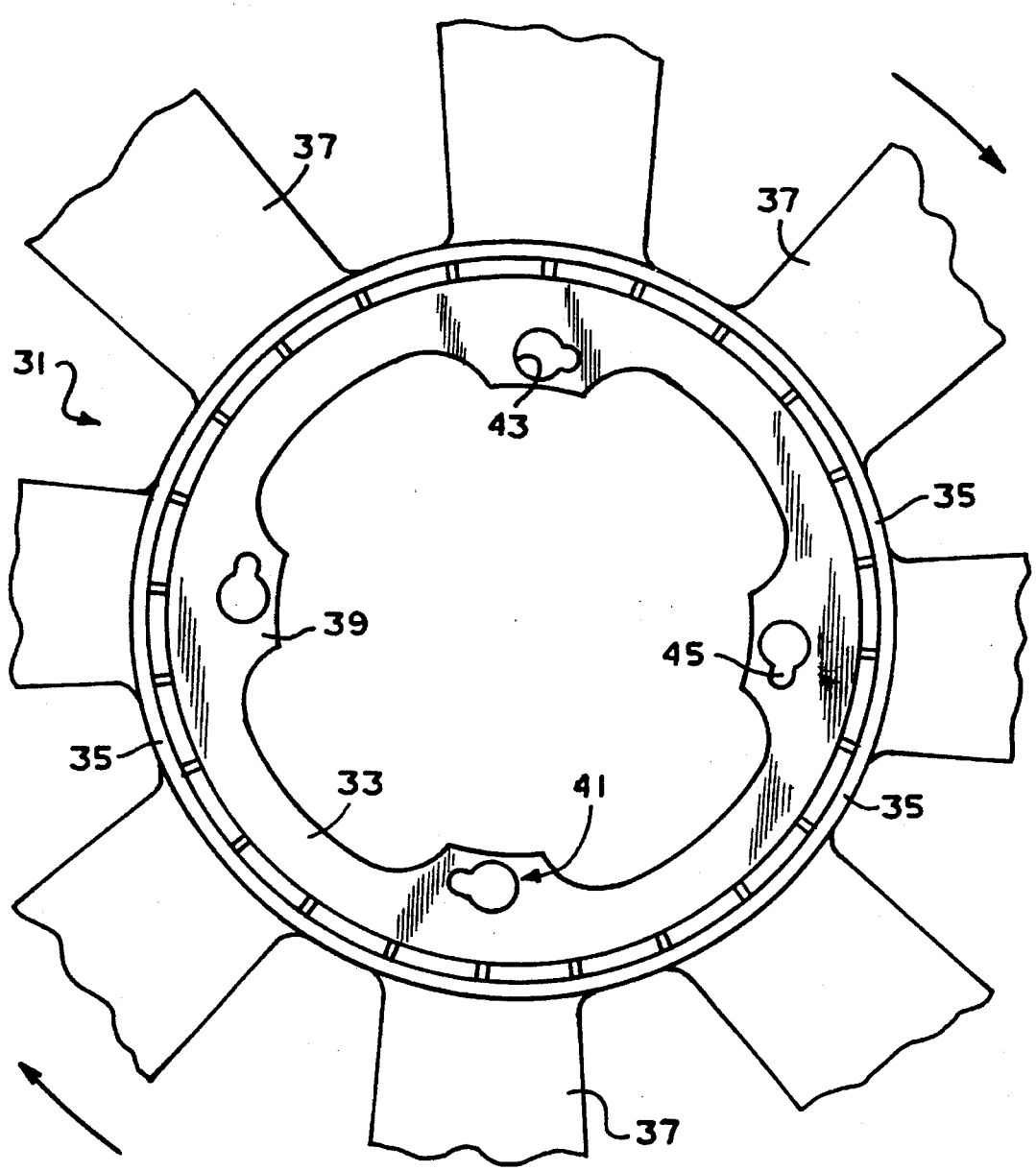
FIG. 3 is a fragmentary, front plan view of a fan of the type with which the present invention may be utilized, but on a smaller scale than FIG. 1.

Referring now to FIG. 3, there is illustrated a front plan view of a fan assembly, generally designated 31, which includes two primary elements. The first is a stamped metal spider 33 which typically includes an outward, peripheral portion (not shown herein; see incorporated patents). The second element is a molded, integral assembly comprising a fan hub 35, which is typically molded about the outer peripheral portion of the spider 33, and a plurality of an blades 37. It is believed to be within the ability of those skilled in the art to mold the assembly of the fan hub 35 and fan blades 37 in place about the metal spider 35. Such a molding method is not an essential feature of the present invention, however, and therefore will not be described further herein. It is also within the scope of the present invention for the fan to comprise a stamped steel fan, which can have any one of a number of different configurations. All that is required for the present invention is that there be a portion such as the spider 33 which is adapted to be bolted to the fan drive.

In accordance with one important aspect of the present invention, the metal spider 33 includes four mounting portions 39, each of which defines a fastener opening, generally designated 41. Obviously, the four fastener openings 41 must be positioned to correspond to the locations of the four threaded bores 23. Each fastener opening includes a first, larger opening portion 43, and a second, smaller opening portion 45. As may best be seen in FIGS. 3 and 4, the first and second opening portions 43 and 45 together comprise one continuous fastener opening 41, for reasons which will become apparent subsequently. Typically, each fan drive 11 is designed to operate in one particular direction of rotation, here assumed to be the clockwise direction as viewed in FIG. 1. The fan assembly 31 is also designed for the same direction of operation, i.e., in terms of the orientation of the fan blades 37. Therefore, in accordance with the present invention, the smaller opening portion 45 "leads" the larger opening portion 43 in the intended direction of rotation (see arrows in FIG. 3) of the fan assembly 31.

ASSEMBLY METHOD

Referring again primarily to FIGS. 1 and 2, the assembly method of the present invention will now be described. Instead of placing the fan assembly 31 in its assembled position relative to the viscous fan drive 11 as in the prior art, the first step in the assembly method of the present invention is to insert each of the bolts 35, i.e., to thread the threaded portions 27 into the threaded bores 23. Assuming that the stamped metal spider 33 has an axial thickness X, it is preferable for the bolts 25 to be threaded to the position shown in FIG. 2 wherein the axial separation between a forward surface 47 of the fan mounting portion 21 and the underside of the head portion 29 is equal to or greater than X. Preferably, the insertion of the bolts 25 would be performed by the viscous fan drive manufacturer, so that the fan drive 11 would be shipped to the OEM assembly plant with the four bolts 25 in the position shown in FIG. 2. It may be preferable to apply a thread locking compound to the threads of the bores 23 and the threaded portions 27, so that the bolts 25 remain in the position shown in FIG. 2 during handling and shipping. Alternatively, the bolts 25 could be threaded all the way down with the head portions 29 disposed against the forward surface 47, and then, subsequently, at the OEM assembly plant, the bolts 25 could be backed out to the position shown in FIG. 2 prior to the remainder of the assembly method. It should be understood that the above-described alternative is within the scope of the assembly method of the present invention.

Figure 4:
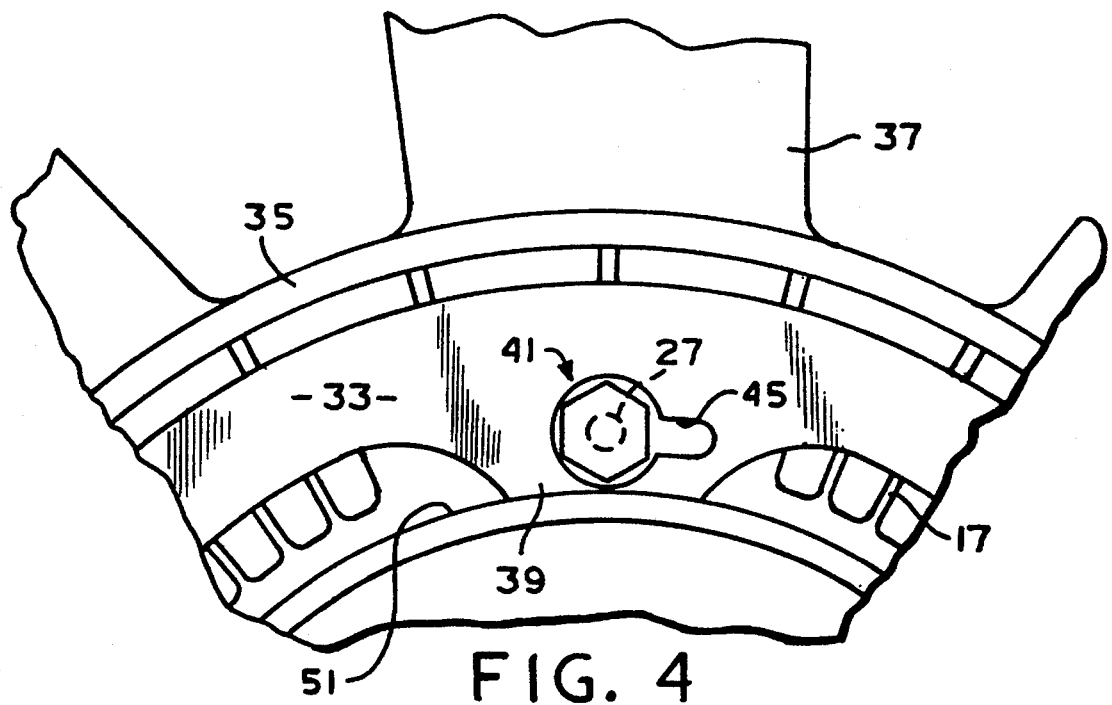
FIG. 4 is an enlarged, fragmentary view of the fan and fan drive assembly, illustrating one stage of the assembly method of the present invention.

Referring now primarily to FIGS. 1 and 4, when the fan drive 11 and the fan assembly 31 are brought together at the OEM assembly plant, the fan drive 11 is preferably placed in a fixture, the only portions of the fixture shown in FIG. 1 being the three jaw pieces 49, which receive the body member 13 of the fan drive and prevent rotation thereof during the subsequent assembly steps.

Referring now primarily to FIG. 4, after the fan drive 11 is placed within the jaw pieces 49, the fan assembly 31 is put in place with the mounting portions 39 engaging a pilot diameter 51, defined by the body member 13. The fan assembly 31 is positioned, rotationally, such that each of the larger opening portions 43 fits over its respective bolt head portion 29, and the underside of the metal spider 33 engages the forward surface 47 of each of the fan mounting portions 21.

Figure 5:
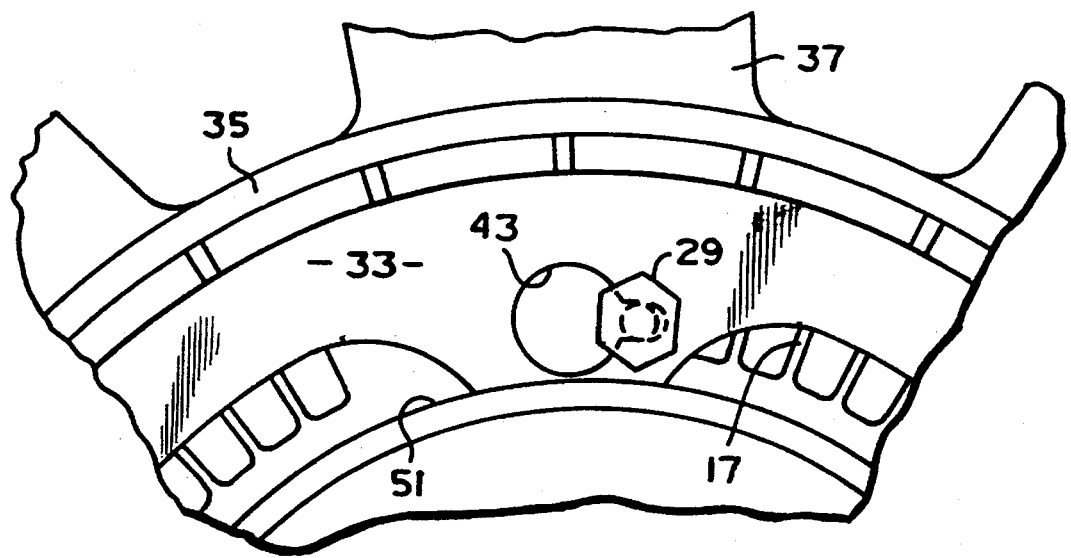
FIG. 5 is an enlarged, fragmentary plan view, similar to FIG. 4, but illustrating a subsequent stage of the assembly method of the present invention.

When the fan assembly 31 is in the position shown in FIG. 4, with the spider 33 engaging the forward surface 47, the next step is to rotate the fan assembly 31 counterclockwise from the position shown in FIG. 4 to the position shown in FIG. 5. Note that the arrows shown in FIG. 3 indicate the direction of rotation of the fan and fan drive assembly during operation. Therefore, when the fan assembly 31 is rotated to the position shown in FIG. 5, the portion of the spider 33 on either side (radially) of the smaller opening portion 45 passes under the head portion 29, until the threaded portion 27 of the bolt 25 reaches the end of the smaller opening portion 45.

With the fan assembly 31 in the position shown in FIG. 5, all that is left to do is torque each of the bolts 25 down tight against the spider 33, to the desired level of tightening torque. Those skilled in the art will appreciate that the torque level of the bolts 25 may have to be somewhat greater than in the prior art, in view of the fact that, as is best shown in FIG. 5, part of the head portion 29 of the bolt 25 is "in engagement" with part of the fastener opening 41, rather having the spider 33 under the entire head portion 29.

It may be seen that the assembly method of the present invention greatly simplifies the assembly which must be done in the OEM assembly plant, and should substantially eliminate occurrences of bolt strippage in the assembly plant, especially if each of the bolts is already threaded to the position shown in FIG. 2 prior to shipping the fan drive to the OEM assembly plant.

Although the subject embodiment is illustrated as including the bolts 25, it should be understood that the invention is equally adapted for use with fan drives in which a threaded stud is cast or threaded in place in the body member 13 at the location of each of the threaded bores 23. A nut is then run onto the threaded portion which extends forwardly from the body member 13 such that the nut is basically in the same position as the head portion 29 shown in FIG. 2. With such an alternative embodiment, after the nuts are in place on the threaded studs, the subsequent assembly process at the OEM assembly plant is substantially identical to that described previously with regard to the primary embodiment.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A method of assembling a fan and fan drive, the fan drive being of the type comprising an output assembly, an input member and means operable to transmit torque from said input member to said output assembly; the fan being of the type comprising a mounting portion, adapted to be bolted to said output assembly of said fan drive, and a plurality of fan blades; said output assembly of said fan drive defining a plurality N of bores, and a plurality N of threaded fasteners, each of said fasteners adapted to be in threaded engagement with one of said bores, and each of said fasteners including a threaded portion and a head portion; said mounting portion of said fan having an axial thickness (X) and defining a plurality N of fastener openings; said method comprising:

(a) inserting each of said threaded portions of said plurality N of threaded fasteners into one of said bores, to a position whereby said head portion is spaced from an adjacent surface of said output assembly by an axial dimension at least equal to said axial thickness (X);

(b) providing a fan wherein each of said fastener openings is generally keyhole shaped, and includes a first, larger portion which is larger than said head portion of said fastener, and a second, smaller portion, which is smaller than said head portion, but larger than said threaded portion;

(c) subsequent to steps (a) and (b), placing said mounting portion of said fan proximate said adjacent surface of said output assembly, ith said head portions of said threaded fasteners extending through said first, larger portions of said fastener openings;

(d) moving said fan relative to said fan drive to a position in which said second, smaller portions of said fastener openings are disposed about said threaded portions; and (e) tightening said threaded fastener head portions against said mounting portion of said fan.

2. A method as claimed in claim 1 characterized by said means operable to transmit torque from said input member to said output assembly comprises said input member and said output assembly cooperating to define a viscous shear space operable, when filled with a viscous fluid, to transmit torque by means of viscous shear.

3. A method as claimed in claim 1 characterized by said fan including a stamped metal spider comprising said mounting portion, and a molded, integral assembly of a fan hub and said plurality of fan blades.

4. A method as claimed in claim 1 characterized by said plurality N of threaded fasteners comprises a plurality N of bolts, each bolt including said threaded portion formed integrally with said head portion.

5. A method as claimed in claim 1 characterized by said mounting portion of said fan comprising a stamped, generally planar, metal member.

6. A method as claimed in claim 1 characterized by each of said plurality N of bores comprising a threaded bore and said step (a) comprises threading said threaded portions into said threaded bores.

7. A method as claimed in claim 6 characterized by said step (a) comprises threading said threaded portions into said threaded bores to a position whereby each of said head portions is spaced from said adjacent surface of said output assembly by an axial dimension somewhat greater than said axial thickness (X).

8. A method as claimed in claim 1 characterized by said adjacent surface of said output assembly comprises a forward surface in the direction of travel of a vehicle.

9. A method as claimed in claim 1 characterized by said step (b) comprises providing a fan wherein each of said smaller portions is circumferentially adjacent its larger portion, and said step (d) comprises rotating said fan relative to said fan drive, so that said threaded portions move circumferentially, relative to said fan, from said larger portions of said fastener openings to said smaller portions.

\* \* \* \* \*